(12) United States Patent
Hanimann et al.

(10) Patent No.: US 8,877,107 B2
(45) Date of Patent: Nov. 4, 2014

(54) METHOD FOR INCREASING THE MOLECULAR WEIGHT OF A POLYESTER GRANULATE BY USING ITS RESIDUAL HEAT

(75) Inventors: Kurt Hanimann, Rodels/Pratval (CH); Rainer Schaller, Wertingen (DE); Eike Schulz Van Endert, Berlin (DE)

(73) Assignee: Uhde Inventa-Fischer GmbH, Berlin (DE)

( * ) Notice: Subject to any disclaimer, the term of this patent is extended or adjusted under 35 U.S.C. 154(b) by 0 days.

(21) Appl. No.: 13/246,051

(22) Filed: Sep. 27, 2011

(65) Prior Publication Data

US 2012/0077951 A1  Mar. 29, 2012

Related U.S. Application Data

(60) Provisional application No. 61/387,036, filed on Sep. 28, 2010.

(51) Int. Cl.
*C08G 63/88* (2006.01)
*C08G 63/80* (2006.01)
*B01J 19/18* (2006.01)

(52) U.S. Cl.
CPC ............ *C08G 63/80* (2013.01); *B01J 19/1806* (2013.01)
USPC ........................................... 264/142; 264/14

(58) Field of Classification Search
USPC .................................................... 264/142, 14
See application file for complete search history.

(56) References Cited

U.S. PATENT DOCUMENTS

| 5,292,865 | A  | * | 3/1994  | Kerpes et al. | 528/492 |
|-----------|----|---|---------|---------------|---------|
| 2007/0073037 | A1 | * | 3/2007  | Otto et al.   | 528/480 |
| 2007/0132134 | A1 | * | 6/2007  | Eloo          | 264/143 |
| 2008/0293912 | A1 | * | 11/2008 | Jernigan      | 528/279 |
| 2009/0057936 | A1 | * | 3/2009  | Hanimann et al. | 264/8 |

FOREIGN PATENT DOCUMENTS

DE          102005010706     *  9/2006  ............... B29B 9/16

* cited by examiner

*Primary Examiner* — Yogendra Gupta
*Assistant Examiner* — Kimberly A Stewart
(74) *Attorney, Agent, or Firm* — Marshall & Melhorn, LLC

(57) ABSTRACT

The present invention relates to increasing the molecular weight during a thermal treatment of polyester in combination with a latent heat granulation. With the newly-developed method, an SSP (Solid State Postcondensation) can be directly combined with an underwater granulation. The method differs from a conventional solid state postcondensation by an increase in the molecular weight being possible without additional heat input and hence only by using the residual heat and the crystallization heat present. A characterizing element is improved water separation and dehumidification during the granulation. Only in this way is an increase in viscosity possible even with a small granulate of an average particle weight less than 20 mg.

23 Claims, 2 Drawing Sheets

METHOD FOR INCREASING THE MOLECULAR WEIGHT OF A POLYESTER GRANULATE BY USING ITS RESIDUAL HEAT

BACKGROUND OF THE INVENTION

The present invention relates to increasing the molecular weight during a thermal treatment of polyester in combination with a latent heat granulation. With the newly-developed method, an SSP (Solid State Postcondensation) can be directly combined with an underwater granulation. The method differs from a conventional solid state postcondensation by an increase in the molecular weight being possible without additional heat input and hence only by using the residual heat and the crystallisation heat present. A characterising element is improved water separation and dehumidification during the granulation. Only in this way is an increase in viscosity possible even with a small granulate of an average particle weight less than 20 mg.

To date, it has been typical of solid state postcondensation plants for polyester that, after the water separation of the granulation, once again drying and crystallisation with heat supply is provided in order to achieve the required reaction temperature and to prevent degradation by hydrolysis.

Polyester is generally produced under vacuum in a melt phase at 275 to 300° C. final temperature. The product is used directly as melt or processed to form granulate and thus is made available for further processing via a melting extruder. According to the application, different quality demands are made, above all with respect to the intrinsic viscosity.

For further processing to form bottles, films or industrial yarns, higher strengths are required than in the synthetic fibre industry. The additionally desired viscosity increase can be effected in an extended polycondensation, relative to that which is normal in the case of fibre raw materials, in the melt phase itself or in a solid state postcondensation. In the case of solid state postcondensation, a granulate is dried again and heated and then polycondensed in the vacuum or in a gas flow at temperatures of 200 to 225° C. Vacuum or a gas flow are required for progress of the reaction in order to discharge the resulting by-products (ethylene glycol, water and also other highly volatile, organic materials).

In U.S. Pat. No. 4,064,112, the thermal damage which arose earlier during the melt condensation at an intrinsic viscosity of more than 0.7 is described. The nowadays common method of solid state postcondensation in an inert gas flow in the shaft reactor at approx. 220° C. is described. It is likewise disclosed how the residual water from the granulation or water absorbed by the polyester due to hygroscopy must be removed. For this purpose, a drying unit is installed before the solid state postcondensation. Furthermore, it is described how the agglutination arising during heating must be avoided by movement during the crystallisation. U.S. Pat. No. 4,064,112 also relates to the removal of highly volatile by-products in a solid state postcondensation (dealdehydisation).

The latent heat crystallisation is described in EP 1 608 696. In this method, the granulate is only cooled to such an extent that, after removal of the cooling water with an agitating centrifuge, the inherent heat remaining in the particle can be used directly for crystallisation. The aim is to avoid agglutination by means of a vibrating channel downstream of the agitating centrifuge. The method serves for the purpose of achieving a sought degree of crystallisation for the further processing. It was shown later that no agglutination occurs even without an agitating bed (cf. DE 103 49 016 with the subsequent DE 10 2006 013 062).

In a further step for process intensivisation, a method is represented in WO 2006/06030 in which high intrinsic viscosity is achieved in a melt polycondensation, a low content of acetaldehyde being achieved by skilful process management. Hence, for the first time bottle granulate was able to be produced on an industrial scale without solid state postcondensation. For this new so-called melt-to-resin process (MTR®), latent heat granulation was used. In addition, the inherent heat remaining in the granulate and the generated crystallisation heat was used directly for reducing the acetaldehyde content by means of a thermal treatment with air at 175° C. An increase in viscosity was not sought after.

In U.S. Pat. No. 7,674,878, a latent heat granulating method, in which a non-adhering granulate is made available for further processing at a controlled temperature level by shock cooling, is described.

A reduction in viscosity due to moisture after the agitating centrifuge must be avoided in the above-described MTR® method. The result of a further development is emphasised in WO 2009/027 064. An improved agitating centrifuge which is distinguished by a tangential entry of the granulate-water mixture into the agitating centrifuge is presented therein. The diameter of the agitating centrifuge is widened at the top. After the main dewatering in the lower part, the residual water is centrifuged off with an increased diameter. The vapour withdrawal is assisted by centrally fed air. Dry air is also conducted in counterflow at the granulate outlet and the following silos in order to avoid entrainment of moisture in the thermal further processing (dealdehydisation). A reduction in viscosity due to hydrolysis can thus be extensively avoided.

In U.S. Pat. No. 5,292,865, the essential elements of a method with melt polycondensation and dealdehydisation are described. The treatment with dry air and a thereby arising increase in viscosity at 170 to 185° C. with a treatment time of 10 to 12 hours are emphasised. In addition, a latent heat crystallisation method is described in which the problematic agglutination with other crystallisation methods does not occur. The representation of a temperature-controlled latent heat crystallisation which permits an optimal operating window for the dealdehydisation even for a small particle and which is crucial for industrial use is however not described in this patent. The granulate must merely be dried in a complex manner according to this method in order that an increase in viscosity takes place, which outweighs the reduction in viscosity due to hydrolysis.

However, various economic and qualitative disadvantages must be ascribed to the established methods.

1. Thermal Stress in the Melt Postcondensation

At a higher intrinsic viscosity, the melt viscosity also increases in the polycondensation reactors. The melt flow and above all the surface formation and hence the discharge of the by-products are made difficult. As a result, higher temperatures or long dwell times must be provided. Hence, degradation reactions which run contrary to the increase in viscosity and lead to material losses are promoted.

2. Energy and Investment Expenditure in the SSP

The pre-product in the form of a granulate must be dried and heated. The product is thereby crystallised and complex, mechanically moving intermediate steps must be provided in order to prevent the agglutination of the granulate particles triggered during the crystallisation. The treatment in fluidised beds leads to dust formation and demands corresponding filter plants for a stable operation.

3. Thermooxidative Damage to the Granulate During an SSP

According to conventional experience, the solid state postcondensation in a gas flow starts detectably only from approx. 180° C., in which, when using air, already the beginning of oxidative damage must however be taken into account. At lower temperatures (approx. 160° C.), a solid condensation could also be implemented with air with correspondingly long reaction times. However, in order to avoid large apparatus via an acceleration of the reaction, essentially higher temperatures must in practice be operated at, an inert gas then requiring to be used in any event: from approx. 190° C., the oxygen component of the air leads to significantly visible quality losses; on the other hand, inert gases are expensive and must be recirculated. For this purpose, oxygen and any by-products occurring must be removed via complex purification plants.

4. Reduction in Molecular Weight Due to Hydrolysis

Polyester is hygroscopic and absorbs moisture during the granulation or during storage in an air atmosphere. Before further processing, the material must therefore be dried, generally in a solid bed or a fluidised bed with air or an inert gas. The residual moisture in the granulate, but also the moisture in the drying air or in an inert gas circulation, leads to hydrolysis and hence to a reduction in viscosity.

5. Hydrolysis During Reuse of Recycled Pet Bottles in New Drink Bottles

After use, PET bottles are collected, sorted, washed and ground into flakes. For reuse, residual contamination must be expelled. For this purpose, the material is treated thermally under vacuum or inert gases. Residual moisture leads to hydrolysis and hence a reduction in viscosity. For reuse of this material in new bottles, this viscosity must be increased again.

It is problematic in particular in the above-mentioned production method of polyester pellets, in particular in the already known latent heat crystallisation method, that, in the case of the method implementations known from the state of the art, during crystallisation of the pellets a reduction in intrinsic viscosity and hence in molecular weight of the polyester used has always been able to be observed up to a certain degree. In the case where such a reduction in molecular weight of the polyester granulate should be counteracted, a further subsequent solid state postcondensation was therefore always absolutely necessary.

SUMMARY OF THE INVENTION

It is therefore the object of the present invention to develop the crystallisation method known from the state of the art such that a reduction in the intrinsic viscosity of the polyester granulate used is avoided.

This object is achieved by the features of patent claim 1, the dependent patent claims representing advantageous embodiments of the method according to the invention.

According to the invention, a method for producing a non-adhering polyester granulate is hence indicated, in which b) the granulate obtained in step a) is subjected, directly following step a), to a thermal drying and post-treatment by supplying the granulate with a gas flow of a gas or gas mixture, the granulate being guided during the post-treatment through a conditioning device, during step b), neither the granulate used nor the supplied gas or gas mixture of the gas flow being heated by external energy input.

The method combines an underwater granulation method with a thermal treatment in a gas flow and is distinguished by improved water separation and dehumidification between granulation and thermal treatment. After the water separation, the residual moisture is preferably less than 200 ppm, relative to the granulate weight. The method is distinguished furthermore by the fact that no heat is supplied to the granulate and to the gas flow for the water separation and the thermal treatment, and the thermal treatment is preferably implemented at more than 165° C.

Completely surprisingly, it was established that, during an implementation of the above-described method a direct increase in the molecular weight of the polyester granulate used in this way in step b) could be observed during the crystallisation process. The residual heat contained in the polyester granulate is hereby used in order to carry out at the same time a postcondensation with simultaneous crystallisation of the granulate. The obtained polyester granules are therefore not only non-adhering, but also have—compared with the intrinsic viscosity according to step a), i.e. the hot water granulation—a higher intrinsic viscosity.

According to the method according to the invention, an increase in viscosity of up to 0.30 dl/g according to the ASTM measuring method can be obtained in comparison with the melt used. The increase in viscosity is thereby preferably at least 0.02 dl/g.

It is possible with the new method to achieve the residual moisture and reaction temperature required for the postcondensation directly with the residual heat. The combination of a latent heat granulation with improved water separation and dehumidification with a thermal treatment may from now on be termed "residual heat postcondensation" or "thermal treatment". The increase in the molecular weight can thereby be of subordinate importance if the thermal treatment serves for other purposes such as dealdehydisation or decontamination.

With the term polyester used here, in addition to polyethylene terephthalate, also the related copolymers are intended, in the production of which part of the monomers (ethylene glycol and terephthalic acid) are replaced by other diols or dicarboxylic acids.

The intrinsic viscosity (I.V.) is used according to the invention as characteristic dimension for the molecular weight. Higher I.V. and hence longer molecules represent higher strength. Because various viscosity measuring methods are used in the expert field, always the intrinsic viscosity here measured according to the ASTM method (I.V. according to ASTM) is used. The I.V. of the granulate used can thereby typically be between 0.62 and 0.90, preferably between 0.70 and 0.80.

In the case of underwater granulation, the granulate is kept at a high temperature level, namely above the glass conversion point, by means of very short contact with water (shock cooling). The water is separated rapidly in an agitating centrifuge and the residual water is evaporated above all by the heat flowing out of the core. Despite immediately beginning crystallisation, no agglutination arises and the granulate can be further processed thermally directly to form the product thanks to the inherent heat without additional heat input. The crystallisation heat occurring assists the increase in temperature in addition.

With the newly developed method of residual heat postcondensation, a thermal treatment becomes possible, in which the portrayed disadvantages can be reduced or entirely overcome.

The invention offers, in addition to the increase in viscosity, the following advantages:

It becomes possible for a melt phase polycondensation to operate at a lower exit viscosity. The reaction can be implemented at a lower temperature. An improvement in quality is produced therefrom by a reduction in thermal damage.

For a melt phase polycondensation with a lower exit viscosity, shorter dwell times are possible. Hence a higher throughput is produced with reactors of the same size.

The residual heat postcondensation, in comparison with a conventional SSP, can be operated without additional mechanically moving drying or crystallisation. Investment costs and energy expenditure are less. The material loss due to dust development is less.

The residual heat postcondensation, in comparison with a conventional SSP, can be operated with a smaller gas flow.

In the case of a dealdehydisation, an additional gain in viscosity is possible with the same operating costs and investment costs.

In the case of a dealdehydisation, better quality can be achieved thanks to improved temperature management.

In the case of a regeneration process of PET bottles, a residual heat postcondensation can assist decontamination. It is desired here above all that the reduction in viscosity due to hydrolysis which is unavoidable during melting in the extruder can be compensated for.

In the case of a regeneration process of PET bottles, hot and dry waste air from the thermal treatment can be used for drying the flakes before the extruder. This drying can then be used even for a first step for decontamination.

Continuing granulate drying.

Removal of by-products.

Removal of contamination.

Decontamination of recycled bottles.

Granulate transport.

Preferred conditions for the IV increase without loss of quality by oxidative damage are the following:

Achieving a high average temperature in the case of latent heat granulation, even with a small granulate particle, i.e. even in the case of a high ratio of product surface to product volume.

Exact control of the shock cooling by adjusting the granulating water temperature and the contact time of the granulate with the water.

Efficient separation of the surface water remaining on the particle and removal of the resulting water vapour.

Supply of very dry air for thermal treatment.

The invention now describes how the combination of a latent heat granulation with a thermal treatment with a gas provides a granulate which has a substantially higher viscosity than the melt. The method of a residual heat postcondensation is based on improved water separation and drying in the latent heat granulation process. Cooling and temperature variations due to uncontrolled water evaporation after the dryer are avoided.

The hydrolysis is extensively prevented. Without heat supply and using the inherent heat and the crystallisation heat, the thermal treatment can be implemented at a precisely set temperature level which is immediately below the critical temperature of a quality loss by oxidative degradation.

A preferred embodiment of the method according to the invention provides that the gas or gas mixture is selected from the group consisting of nitrogen, air, inert gases and/or mixtures hereof.

The gas or gas mixture used according to the invention, which is produced in step b), has preferably a very low water content, before being placed in the conditioning device, i.e. is very dry. The water content can be expressed by the dew point which is, in preferred embodiments, $\leq 0°$ C., preferably $\leq -10°$ C., particularly preferred $\leq -40°$ C. It is further preferred if the gas and/or gas mixture used is free of organic components, such as e.g. solvents etc. There is understood by "free of", a content which is no longer detectable analytically, (e.g. $\leq 0.1$ ppm). For this purpose, the gas and/or gas mixture can be freed of organic components, for example by means of a gas processing plant, and dried to a dew point of less than $-10°$ C.

The gas flow is preferably released in step b) at an empty pipe speed of 0.01 to 0.5 m/s, preferably 0.05 to 0.15 m/s. The empty pipe speed is determined by subjecting the empty, i.e. unloaded, conditioning device to a flow of gas and determining the flow velocity of this gas flow (empty pipe speed).

Preferred released gas quantities into the conditioning device are hereby between 0.05 and 1 kg, preferably between 0.1 and 0.5 kg, gas mixture per kg of the granulate used. This gas quantity is preferably released per hour. It is likewise possible to conduct the gas in a mass ratio of 1:10 up to at most 1:1 in counterflow to the granulate.

The heated gas flow separated from the granulate, from the conditioning device, can thereby advantageously be used for the following purposes:

Dehumidification of the gas used for the thermal treatment.

Drying of recycled flakes.

Granulate transport.

Removal of highly volatile by-products, such as acetaldehyde, from the waste water of a polycondensation plant.

For this purpose, the entire gas flow, but also only part of the gas flow, can be used.

In a further preferred embodiment, the dwell time of the granulate in step b) is between 1 and 30 hours, preferably between 4 and 20 hours, further preferred between 6 and 14 hours, particularly preferred between 8 and 12 hours.

In particular, particularly advantageous increases in the intrinsic viscosity are produced if, in step a), a granulate which has an average particle weight of 5 to 30 mg, preferably 8 to 20 mg, particularly preferred 10 to 16 mg, is produced.

Preferred dwell times of the granulate in the cooling stretch in step a) are between 0.1 and 2 s, preferably between 0.2 and 0.8 s.

The speed of the water in the cooling stretch between granulation and agitating centrifuge is preferably more than 4 m/s, further preferred 8 to 12 m/s.

The core temperatures of the polyester granulate released into the conditioning device must thereby be high enough that the polyester strands can react with each other during further polycondensation so that the observed increase in molecular mass or the intrinsic viscosity can be achieved. Preferably, the temperature of the core of the released granulate is thereby far above the glass transition temperature point of the polyester material used. Particularly preferred temperatures of the granulate bed are thereby between 175 and 220° C., further preferred between 175 and 195° C., particularly preferred between 180 and 190° C.

The granulate temperature can thereby be adjusted for example by corresponding choice of at least one or a corresponding combination of several of the following process parameters:

Contact time between granulate and cooling water due to the length and speed of the water in the cooling stretch, the contact time being less than 1 second, preferably less than 0.5 seconds.

Contact time between granulate and cooling water in the agitating centrifuge, given by the rotor diameter and the speed of rotation of the agitating centrifuge, the contact time being less than 1 second, preferably less than 0.5 seconds.

Temperature of the cooling water, a temperature between 40 and 98° C. being adjusted, preferably between 75 and 90° C.

Air quantity which is given by the size and speed of rotation of the suction fan.

Granulate size, an average particle size of less than 20 mg, preferably 8 to 16 mg, being set. For this purpose, the melt mass flow, the number of blades of the granulation, the number of nozzle holes and the speed of rotation of the cutting rotor are correspondingly coordinated.

Furthermore, it is advantageous if, between step a) and b), water adhering to the granulate is removed by means of a centrifuge by centrifuging-off. The centrifuge used can be configured for example as an agitating centrifuge, it being of particular advantage if the agitating centrifuge can be separated from the gas system for maintenance purposes by means of fittings.

The pulse of the water-granulate mixture is used advantageously by a tangential entry into the agitating centrifuge for rapid separating of the water by means of centrifugal force.

In order to separate oversized polymer parts from the granulation, a closed chamber, before the entry to the agitating centrifuge, with less than 0.5 s dwell time, is preferably provided with baffles. Part of the water can be separated before the agitating centrifuge by openings on the cooling stretch.

The diameter of the agitating centrifuge is preferably widened at the top conically or stepwise in order to increase the centrifugal forces for centrifuging-off the residual water. Hot gas from the thermal treatment is supplied to the agitating centrifuge advantageously via the exit shaft in counterflow to the granulate. In addition, hot gas from the thermal treatment can be supplied to the interior of the agitator hollow body (agitating centrifuge). The supplied gas and resulting vapour and also drops can be withdrawn by an extractor fan via the sieve of the centrifuge. Preferably, a condenser is provided in the waste air pipe. The granulating water recovered in this way is recirculated to the water circulation of the granulation.

It is particularly preferred, in particular from the point of view of energy, if the gas mixture is separated from the granulate after being supplied to the granulate and is used for separation and/or predrying of the granulate which was separated from the cooling water in step a). In this embodiment, for example air at room temperature can be released into the conditioning device (step b) and conducted in counterflow against the throughput direction of the granulate through the conditioning device. The air flow thereby is warmed continuously. Hence this air can be used for separation of the polyester granulate from the centrifuge without requiring to be preheated.

Likewise, it is possible that, after the gas mixture has been supplied to the granulate, it is separated from the granulate and is used for separation and/or predrying of the granulate which was separated from the cooling water in step a).

The polyester raw material used in step a) can be produced for example by preceding polycondensation reaction of at least one diol with at least one dicarboxylic acid or by reesterification reaction of at least one dicarboxylic acid diester with at least one diol. According to this embodiment, the method relates to a particularly advantageous method for, for example, continuous production of a polyester granulate with high intrinsic viscosity.

However, it is also possible that already pre-manufactured polyester raw material, for example in the form of a granulate and/or flakes, is supplied by melting to the process according to the invention. This melting can be effected for example by means of an extruder.

The polymer used can be produced directly in a polycondensation plant or be melted in an extruder, concerning in particular one of the following plastic materials or mixtures thereof:

polyethylene terephthalate polyethylene terephthalate modified with dicarboxylic acids or diols waste collected after use or waste from production plants which is processed for use in new products.

The granulate produced according to the invention can be isolated as end product and e.g. stored. However, it is also possible to supply the granulate produced according to the invention, according to the thermal treatment according to the invention, in a hot state for further processing on a melting extruder and for example to process it further in a shaping method, such as e.g. injection moulding method, film injection moulding method or deep-drawing, to form corresponding moulded articles. In particular the granulate can consequently be processed to form the following moulded articles:

preforms for bottles films or foils synthetic fibres

BRIEF DESCRIPTION OF THE DRAWINGS

The present invention is described further subsequently with reference to the accompanying Figures and the subsequent embodiments in more detail without restricting the invention however to the special parameters which are represented.

DETAILED DESCRIPTION OF THE INVENTION

Figure 1:
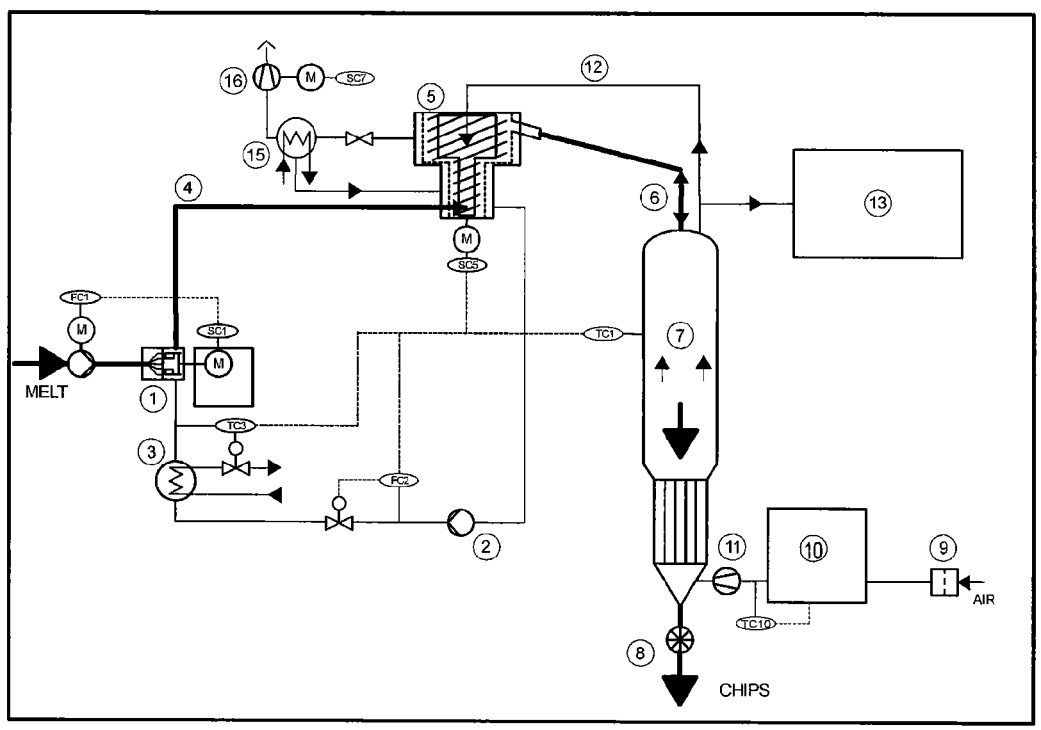
FIG. 1 is a representation of the method of a residual heat postcondensation in which dehumidified environmental air is guided in counterflow to the granulate.

In FIG. 1, the method of a residual heat postcondensation is represented, in which dehumidified environmental air is guided in counterflow to the granulate. Thanks to an improved water separation and controlled temperature guidance, the method permits an increase in viscosity of typically 0.05 dl/g according to ASTM. In the representation, the residual heat postcondensation is used for a dealdehydisation with air. Hence, the temperature can be adjusted, without quality loss, near to the boundary temperature for oxidative damage to the polymer. In addition to the increase in viscosity, also a low AA content for the bottle granulate produced therefrom is achieved in the improved MTR® method represented here.

The method represented in FIG. 1 consists of the following main components:

(1) Underwater granulation: a controlled quantity of polyester melt (FC1) is pressed into a chamber through which water flows, via a suitable number of nozzles. The required number of blades grinds over the nozzle plate (SC1) at a speed of rotation which is controlled proportionally to the quantity of melt and thus produces a ball-shaped granulate with a defined average particle weight. A low particle weight with a large ratio of product surface to mass is advantageous because as a result the dealdehydisation, the viscosity increase or if necessary decontamination proceed faster. For a small particle, higher demands are placed however on the method in order to achieve the high and constant temperature demanded in the thermal treatment. Also the entrainment of moisture is more difficult to avoid in the case of a small granulate.

(2) Cooling water circulation: the quantity of granulating water circulated by the circulation pump (2) is controlled in order that the desired dwell time and hence the cooling of the melt is adjusted in the cooling stretch (4): the longer the dwell time, the less the residual heat in the particle cooling from the outside to the inside.

(3) Temperature adjustment of the granulating water: in addition to the dwell time in the cooling stretch, the water temperature controlled in the cooler (3) with (TC3) has a great influence on the remaining residual heat.

(5) Agitating centrifuge→water removal: in addition to the dwell time and the temperature in the cooling stretch, the remaining contact time between water and granulate particle in the agitating centrifuge (5) is crucial for the residual heat which remains in the granulate particle. In order also to ensure a high residual heat content for the desired small granulate particle, very rapid separation of the water from the particle is necessary. This is effected by a tangential entry into the centrifuge at high speed in order to ensure centrifuging-off of the water without swirling and without time loss directly at the entrance to the rotor. With the controllable speed of rotation of the rotor (SC5), the contact time of granulate-water in the centrifuge can be adjusted optimally.

(5) Agitating centrifuge→postcondensation: the residual water adhering to the particle effects a further (undesired) cooling because of the postcondensation. The diameter of the agitating centrifuge is therefore—as described in the application DE 10 2007 040 135.5—chosen to be greater in the upper region in order to increase the centrifugal forces.

(16) Suction: fine drops and water vapour are withdrawn as rapidly as possible by the extractor fan (16) through the sieve of the centrifuge, the water being recovered extensively via the condenser (15). The extraction is assisted by hot and dry gas from the thermal treatment (12).

(6), (12) Gas conductance: the gas flow from the thermal treatment is divided such that the granulate flow is not impeded. A part goes via the granulating shaft (6) to the exit of the agitating centrifuge (5). It serves for returning the remaining residual moisture which is intended to evaporate still between centrifuge and thermal treatment. In addition, a partial flow (12) is conducted directly into the centre of the centrifuge (5) in order to assist the extraction (16) of the vapours.

(7) Thermal treatment: the temperature of the thermal treatment is given by the residual heat in the granulate and the crystallisation heat. In summary: the residual heat can be controlled (TC1) by the following process values individually or in combination with each other:

Granulate weight divided by melt quantity (FC1) and granulator speed of rotation (SC1)
Contact time of water-granulate divided by the water quantity (FC2) and the speed of the flotation in the cooling stretch (4) and also the speed of rotation of the agitating centrifuge (SC5)
Granulating water temperature (TC3)
Extraction (SC7) with assistance of the gas flows (6) and (12).

By means of the fan (11), air is conducted from bottom to top through the granulate bed which flows from top to bottom in a conditioning device, e.g. a silo. The gas thereby absorbs highly volatile by-products, such as water, ethylene glycol, acetaldehyde etc. At a temperature of preferably more than 175° C., this leads to an increase in viscosity and a reduction in the AA content, i.e. to a solid state postcondensation. With increasing temperature (TC1), both the increase in viscosity just as the AA reduction are greater per temporal unit. In order to avoid quality losses due to oxidative damage, the operation should be changed to inert gases preferably from approx. 185 to 195° C. (sketch 3b). At the same time, decontamination of the granulate, i.e. a dealdehydisation of the granulate takes place so that the obtained product has simultaneously increased viscosity and a low acetaldehyde content (e.g. <1 ppm, preferably <0.5 ppm).

(19) Dehumidification of the air: in the case of a thermal treatment with environmental air, this should be filtered (9). Dehumidification of the air to below −10° C. is necessary in order that a reduction in viscosity by hydrolysis is prevented. For an increase in viscosity, a dew point of below −40° C. should be set (TC10).

(8) Further processing: the granulate can be cooled in a cooler which is integrated in the silo or downstream thereof for the purpose of packaging at the temperature which is permissible for this. However, polyester is hygroscopic and will absorb moisture again during transport. Therefore, direct further processing without cooling is more effective with respect to energy: in this case, the granulate cannot absorb moisture and therefore is also not subjected to hydrolysis. It is thus made possible that the granulate can be melted again directly in an extruder at high temperatures without a reduction in viscosity; and hence an otherwise additionally required drying before the melting is avoided.

(13) Use of the waste heat: the gas emerging from the thermal treatment is hot and dry. The waste gas flow not required for operation of the agitating centrifuge can therefore be used. Typical application cases are:

Heat recovery during the air dehumidification (10) (regeneration).
Use as conveying air for pneumatic heat transport.
Drying of granulate or recycling flakes.

Figure 2:
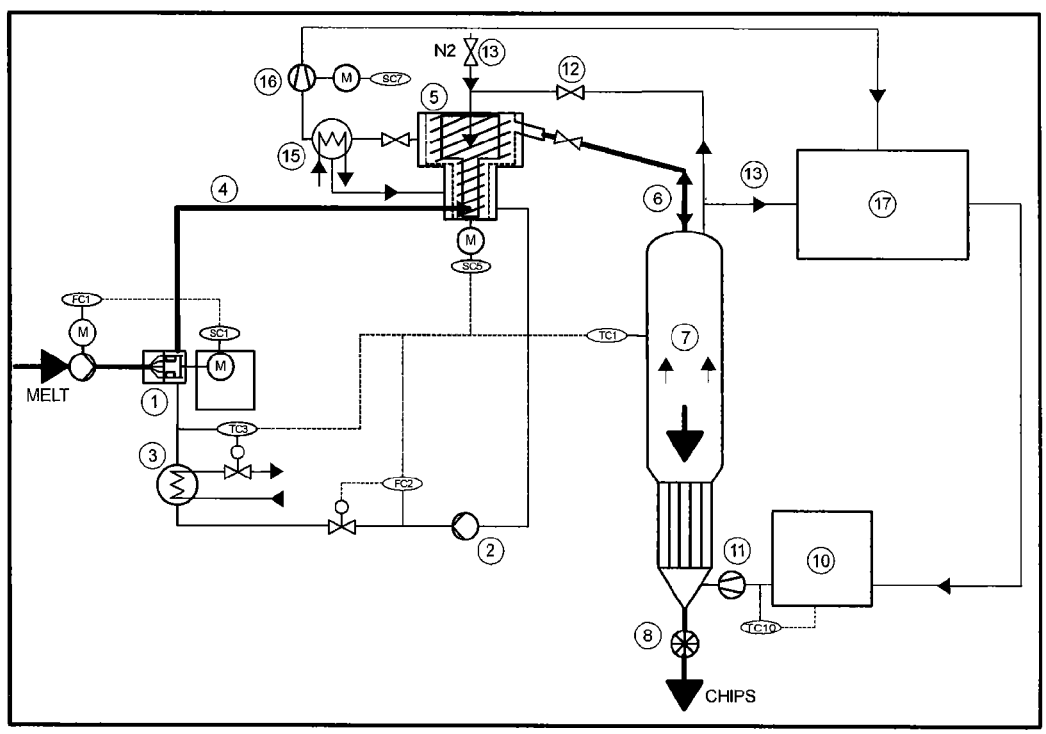
FIG. 2 is a representation of the method of residual heat postcondensation in which an inert gas is conducted in counterflow to the granulate.

In FIG. 2, the method of residual heat postcondensation is represented, in which an inert gas is conducted in counterflow to the granulate. The temperature (TC1) can be operated higher because the oxidative degradation is prevented. In this type of operation, the inert gas must however normally be recirculated on cost grounds as in the solid state postcondensation. In order to avoid enrichment of organic material in this cycle, a gas purification plant (17) should be provided in addition to the dehumidification (10), for example in the form of catalytic combustion.

The description is extensively identical to the thermal treatment as represented in FIG. 1 with environmental air.

The following elements are new:

(5) Cut-off of agitating centrifuge: cut-off fittings are incorporated in the gas supply lines (6) and (12) and the extractor (16). In the case of stoppage of the agitating centrifuge, loss of expensive inert gas can thus be reduced.

(12) Nitrogen feed: in order to keep the air entry minimal after an interruption of the agitating centrifuge, scouring with nitrogen is provided.

(13) Gas purification: the organic by-products originating from the residual heat postcondensation are removed from the circulation. Direct further processing of the hot granulate here is also possible in a melting extruder or cooling with intermediate storage and transport.

EXAMPLES

The values displayed here show measurements from laboratory tests, which compare the course of the increase in viscosity, colour development and dealdehydisation in the case of a thermal treatment with air and with nitrogen at different temperature levels. The intermediate product was cooled to the ambient condition.

TABLE 1

| | Time | Temperature of the granulate bed | AA | Viscosity | Colour Powder | | Colour Granulate | |
|---|---|---|---|---|---|---|---|---|
| | h | °C. | ppm | i.V. | L | b | L | b |
| Thermal treatment with air | 0 | 160 | 23.6 | 0.793 | 91.2 | 2.6 | 79.8 | 2.2 |
| | 12 | Comparative Example | 0.8 | 0.783 | 91.9 | 2.4 | 80.4 | 2.2 |
| | 0 | 170 | 23.6 | 0.793 | 91.2 | 2.6 | 79.8 | 2.2 |
| | 12 | Comparative Example | 0.8 | 0.779 | 92.0 | 2.4 | 80.4 | 1.9 |
| | 0 | 180 | 23.6 | 0.793 | 91.2 | 2.6 | 79.8 | 2.2 |
| | 12 | | 0.5 | 0.813 | 92.9 | 2.2 | 82.1 | 2.7 |
| | 0 | 190 | 23.6 | 0.793 | 91.2 | 2.6 | 79.8 | 2.2 |
| | 12 | | 0.3 | 0.820 | 93.2 | 2.4 | 82.1 | 3.0 |
| | 0 | 200 | 23.6 | 0.793 | 91.2 | 2.6 | 79.8 | 2.2 |
| | 12 | | 0.2 | 0.884 | 93.3 | 2.8 | 82.5 | 3.9 |

TABLE 2

| | Time | Temperature of the granulate bed | AA | Viscosity | Colour Powder | | Colour Granulate | |
|---|---|---|---|---|---|---|---|---|
| | h | °C. | ppm | i.V. | L | b | L | b |
| Thermal treatment with N2 | 0 | 180 | 23.6 | 0.793 | 92.0 | 1.9 | 81.2 | 1.9 |
| | 12 | | 0.8 | 0.850 | 91.0 | 2.5 | 80.4 | 2.5 |
| | 0 | 190 | 23.6 | 0.793 | 92.0 | 1.9 | 81.2 | 1.9 |
| | 12 | | 0.6 | 0.905 | 91.2 | 2.7 | 82.6 | 3.4 |
| | 0 | 200 | 23.6 | 0.793 | 92.0 | 1.9 | 81.2 | 1.9 |
| | 12 | | 0.4 | 0.999 | 90.9 | 2.8 | 82.8 | 2.8 |

The thermal treatment was effected in the batch process with hot dried air or nitrogen. The starting product is identical.

The values measured in a continuous residual heat postcondensation are represented in the following Table:

TABLE 3

| | Time | Temperature of the granulate bed °C. | AA | Viscosity | Colour Granulate | | |
|---|---|---|---|---|---|---|---|
| | h | | ppm | i.V. | L | a | b |
| Thermal treatment with air | 0 | 182.2 | 15.5 | 0.761 | 82.1 | −1.8 | −1.9 |
| | 12 | | 1.0 | 0.807 | 85.8 | −1.4 | −0.7 |
| | 0 | 183.6 | 16.6 | 0.745 | 81.9 | −1.8 | −1.8 |
| | 12 | | 1.0 | 0.800 | 86.0 | −1.5 | −0.5 |
| | 0 | 183.9 | 17.7 | 0.752 | 81.6 | −1.8 | −1.5 |
| | 12 | | 0.7 | 0.803 | 85.7 | −1.3 | −0.4 |
| | 0 | 184.0 | 18.4 | 0.751 | 80.0 | −1.6 | −5.4 |
| | 12 | | 0.5 | 0.804 | 82.5 | −1.1 | −3.3 |
| | 0 | 186.0 | 15.9 | 0.795 | 77.9 | −1.2 | −3.7 |
| | 12 | | 0.5 | 0.844 | 78.8 | −1.0 | −2.5 |

The following further measuring values were determined with these measurements:

| Average granulate weight | 16 mg |
|---|---|
| Dwell time in the cooling stretch | 0.3 s |
| Granulating water temperature entry | 72° C. |
| Dew point of the air at the entry of the thermal treatment | −40° C. |
| Dew point of the air at the exit of the thermal treatment | <−5° C. |
| Residual moisture measured on the raw granulate after the agitating centrifuge | 180 ppm |

The sample drawn directly from the hot granulate flow at the exit of the agitating centrifuge must be closed and cooled without delay because otherwise postcondensation falsifies the measuring values.

Comparative measurements in the case of commercially available agitating centrifuges are higher than 500 ppm at the exit in the case of the residual moisture. The dew point of the air at the exit of the thermal treatment is above 0° C. In the first hour of the thermal treatment, further drying hence takes place, the intrinsic viscosity reducing by 0.01 to 0.03 g/dl due to hydrolysis.

What is claimed is:

1. A method for direct increase in the molecular weight using the residual heat during the production of a non-adhering polyester granulate, comprising steps in which
    a) a polyester raw material as melt is pressed through a nozzle, granulated in a cooling water flow and, after passing through a cooling water stretch, is separated from the cooling water flow, and
    b) a bed of the granulate obtained in step a) is subjected, directly following step a), to a thermal drying and post-treatment by supplying the granulate bed with a gas flow of a gas or gas mixture, the thermal drying and post treatment being conducted in a silo wherein the gas flow of a gas or gas mixture is conducted from bottom to top through the granulate bed and the dew point of the gas or gas mixture before being supplied is ≤ 0° C.,
    wherein during step b), the dwell time of the granulate is between one and thirty hours and neither the granulate used nor the supplied gas or gas mixture of the gas flow is heated by external energy input, and the gas flow is conducted in counterflow to the conduction direction of the granulate in the silo, and the average temperature of the bed of the granulate before entry in step b) is adjusted to more than 170° C.

2. The method according to claim 1, wherein the gas or gas mixture is selected from the group consisting of nitrogen, air, inert gases and/or mixtures thereof.

3. The method according to claim 1, wherein
    a) the flow speed of the gas flow in step b) is 0.01 to 0.5 m/s and/or
    b) between 0.05 and 1 kg gas mixture per kg of the granulate used is used for the supply in step b).

4. The method according to claim 1, wherein the dwell time of the granulate in step b) is between 4 and 20 hours.

5. The method according to claim 1, wherein the granulate produced in step a) is granulated to an average particle weight of 5 to 30 mg.

6. The method according to claim 1, wherein the dwell time of the granulate in the cooling stretch in step a) is between 0.1 and 2 s.

7. The method according to claim 1, wherein the average temperature of the granulate bed before entry in step b) is adjusted to temperatures between 175 and 220° C.

8. The method according to claim 1, wherein the cooling water in step a) has a temperature between 40 and 98° C.

9. The method according to claim 1, wherein, between step a) and b), water adhering to the granulate is removed by means of a centrifuge by centrifuging-off.

10. The method according to claim 1, wherein the gas mixture is separated from the granulate after being supplied to the granulate and is used for separation and/or predrying of the granulate which was separated from the cooling water in step a).

11. The method according to claim 1, wherein the gas flow separated from step b) is divided into two partial flows, one partial flow being contacted in counterflow by the granulate conducted from step a) to step b), and the second partial flow being conducted into a centrifuge which is used for separation of the granulate from the cooling water in step a).

12. The method according to claim 1, wherein the polyester raw material used in step a) is produced by preceding polycondensation reaction of at least one diol with at least one dicarboxylic acid or by reesterification reaction of at least one dicarboxylic acid diester with at least one diol or is obtained by melting of a polyester raw material.

13. The method according to claim 1, wherein the gas or gas mixture before being supplied has a dew point of ≤−10° C.

14. The method according to claim 13, wherein the gas or gas mixture before being supplied has a dew point of −40° C.

15. The method according to claim 3, wherein the flow speed of the gas flow in step b) is 0.05 to 0.15 m/s and/or
b) between 0.1 and 0.5 kg gas mixture per kg of the granulate used is used for the supply in step b).

16. The method according to claim 4, wherein the dwell time of the granulate in step b) is between 6 to 14 hours.

17. The method according to claim 16, wherein the dwell time of the granulate in step b) is between 8 and 12 hours.

18. The method according to claim 5, wherein the granulate produced in step a) is granulated to an average particle weight of 8 to 20 mg.

19. The method according to claim 18, wherein the granulate produced in step a) is granulated to an average particle weight of 10 to 16 mg.

20. The method according to claim 6, wherein the dwell time of the granulate in the cooling stretch in step a) is between 0.2 and 0.8 s.

21. The method according to claim 7, wherein the average temperature of the granulate bed before entry in step b) is adjusted to temperatures between 175 and 195° C.

22. The method according to claim 21, wherein the average temperature of the granulate bed before entry in step b) is adjusted to temperatures between 180 and 190° C.

23. The method according to claim 8, wherein the cooling water in step a) has a temperature between 75 and 90° C.

* * * * *